United States Patent Office 3,063,792
Patented Nov. 13, 1962

3,063,792
CONTINUOUS PRECIPITATION METHOD FOR CONVERSION OF URANYL NITRATE TO URANIUM TETRAFLUORIDE
Gregory M. Reinhart, Hamilton, and Thomas J. Collopy, Cincinnati, Ohio, assignors to the United States of America as represented by the United States Atomic Energy Commission
No Drawing. Filed June 21, 1960, Ser. No. 37,814
9 Claims. (Cl. 23—14.5)

Our invention relates to the production of uranium tetrafluoride and more particularly to the precipitation of uranium from aqueous uranyl nitrate solution and conversion of the precipitate to $UF_4$.

Uranium tetrafluoride, an intermediate useful for the preparation of uranium metal and uranium hexafluoride, is currently produced on a large scale from uranium ore concentrates. In the production method most widely used the ore concentrate is dissolved in nitric acid and subjected to organic solvent extraction to yield a purified aqueous uranyl nitrate solution. The solution is then evaporated and calcined to form uranium trioxide which in turn is converted to $UF_4$ by reduction to uranium dioxide with hydrogen and hydrofluorination of the $UO_2$.

This method of converting the uranyl nitrate solution to $UF_4$ presents certain disadvantages. Excessive heating costs are encountered in evaporating the solution and calcining to form $UO_3$. In addition, the metal pots employed for calcination are subject to extreme corrosion and must be replaced frequently. The provision of $UO_3$ with properties suitable for subsequent process steps presents further difficulties in this method. Both the reduction and hydrofluorination reactions are sensitive to the properties of the $UO_3$, which may vary substantially with only a slight change in calcination conditions or with the presence of impurities such as sodium. As a result, different lots of $UO_3$ may vary widely in their behavior in these reactions, both in their initial reactivity and in the ease with which the reactions are brought to completion. Variations in reactivity are particularly undesirable in the hydrofluorination reaction since excessive amounts of expensive anhydrous hydrogen fluoride may be required. For further information on the problem presented in the further processing of $UO_3$, reference may be made to Uranium Production Technology by C. D. Harrington and A. E. Ruehle (1959), at pages 79 to 81 and 208 to 210.

Uranium tetrafluoride has also been prepared from uranyl nitrate solution by means of a precipitation method in which the uranium is precipitated from solution with ammonium hydroxide and the precipitate is reduced to $UO_2$ and converted to $UF_4$ by hydrofluorination. The precipitation step in this method has presented difficulties both in separation of the precipitate from solution and in the properties of the precipitate with respect to the subsequent process steps. Precipitation has largely been carried out in a batch process, with gaseous ammonia or an ammonium hydroxide solution being added until a relatively high pH, e.g., at least 9, is reached. The precipitate thus obtained exhibits slow filtration rates, and the reactivity of the precipitate in the reduction and hydrofluorination steps is so low that uneconomical batch reactions with long contact times, i.e., at least several hours, have been required. In addition, the density of the $UF_4$ produced by this method is unsuitably low. Precipitation of the uranium has also been carried out continuously at slightly lower pH, i.e., in the range of 7 to 8, by contacting the uranyl nitrate solution with an aqueous ammonium hydroxide solution, the precipitate being separated from the reaction mass after approximately 10 minutes. While the precipitate produced in this manner may exhibit suitable properties for the preparation of nuclear reactor fuel in the form of $UO_2$, this material is unsuitable for conversion to $UF_4$ because of its low reactivity in the reduction and hydrofluorination reactions.

In order to be useful in the large-scale preparation of uranium metal, the $UF_4$ produced in the above-mentioned processes must meet several requirements. A tap density of at least 3.0 is required to provide a suitable charge in bomb-type reduction with magnesium. Purity of over 95 percent, a uranyl fluoride content of under 2.5 percent, and an ammonium oxalate insoluble (a mixture of uranium oxides) content of under 2.5 percent are also required.

It is therefore an object of our invention to provide a method suitable for large-scale preparation of uranium tetrafluoride from uranyl nitrate in aqueous solution.

Another object is to provide a method of continuously precipitating uranium from an aqueous uranyl nitrate solution.

Another object is to provide a method of precipitating uranium from aqueous uranyl nitrate solution in a form suitable for conversion to $UF_4$.

Another object is to provide a method of preparing uranium tetrafluoride exhibiting relatively high purity and high density.

Other objects and advantages of our invention will be apparent from the following detailed description and claims appended hereto.

In accordance with our invention uranium is precipitated from aqueous uranyl nitrate solution by continuously introducing a stream of said solution and a stream of an aqueous ammonium hydroxide solution containing less than 30 percent ammonia by weight into a reaction zone, the ratio of ammonium to uranium in said streams being adjusted to maintain the resulting reaction mass at a pH within the range of 5.0 to 6.5 and the flow rates of said streams being adjusted to provide a mean residence time of the slurry formed in said reaction zone of at least 30 minutes, continuously mixing said reaction mass and continuously withdrawing a portion of said slurry from said reaction zone. The solid precipitate is then separated from the slurry and converted to $UF_4$ by means of calcination, hydrogen reduction and hydrofluorination. The precipitate obtained by this method separates readily from solution and exhibits good reactivity in the subsequent process steps. This method is suitable for large-scale conversion of uranyl nitrate to $UF_4$, and the product $UF_4$ exhibits sufficiently high purity and high density for the preparation of uranium metal. This precipitation method also results in substantial decontamination of the uranium with respect to certain impurities such as sodium.

Although our invention is not to be understood as limited to a particular theory, it is postulated that precipitation under these conditions results in a precipitate comprising principally uranic acid, $H_2UO_4$, with small amounts of ammonium diuranate $(NH_4)_2U_2O_7$ and partially ammoniated compounds such as ammonium hydrogen uranate $NH_4HUO_4$ being formed. In the previous methods precipitation at alkaline pH resulted in a more fully ammoniated precipitate comprising ammonium diuranate and the partially ammoniated compounds, with little or no uranic acid being present. The mean residence time of at least thirty minutes allows the ammoniated compounds which are initially formed in the slurry to be largely converted to uranic acid in the acid medium of the reaction zone. Precipitates formed at acid and alkaline pH's thus exhibit pronounced differences in chemical composition in addition to their different behavior in the subsequent reaction steps in the preparation of $UF_4$.

A mean residence time of the reaction mass formed upon contacting the influent streams of at least 30 minutes is critical to our invention, and approximately one hour is preferred. This time is required to obtain a precipitate with suitable reactivity in reduction and hydrofluorination. A compound approaching the composition ammonium diuranate is formed initially upon contact of the reagent streams and this residence time in the thoroughly mixed acidic medium allows conversion of this compound to uranic acid. Shorter residence times result in a product with the unfavorable reactivity properties obtained by the previous high pH precipitation.

An initial startup period of at least two hours is required in order to obtain a precipitate suitable for conversion to $UF_4$. Complete equilibrium is not reached with this system for approximately eight hours; however, after two hours the reaction proceeds far enough to provide the desired properties. The unsuitable material withdrawn from the reaction zone during the startup period may be blended with the precipitate obtained after equilibrium is reached or may be dissolved and recycled.

The reaction zone is maintained at a pH within the range of 5 to 6.5 by adjusting the ratio of ammonium to uranium in the influent streams. At higher pH the properties of the precipitate are not suitable for filtration and for conversion to $UF_4$ and at lower pH losses of uranium to the filtrate are excessive. In order to obtain optimum results it is preferred to maintain the pH at a constant value of approximately 6.0. This may be accomplished by introducing one of the reagent streams at a constant flow rate and varying the flow rate of the other stream in response to signals from a pH sensing device in the reaction zone. Although not critical, it is preferred to introduce the uranyl nitrate solution at a constant flow rate, and vary the rate of the ammonium hydroxide solution. As described in this specification and in the appended claims pH refers to the actual pH as measured at 25° C. The measured pH of this system decreases with increasing temperatures. For example, if the system under the conditions required to produce a pH of 6.0 at 30° C. is heated to 45° C. the measured pH decreases to a value of 5.7. Accordingly, if precipitation is carried out at a temperature high than room temperature the optimum operating pH value as measured at the higher temperature will be decreased. The decrease in pH is approximately linear with increasing temperature, an increase in temperature of 10° C. resulting in a decrease of approximately 0.2 in the measured pH. Although the temperature is not critical, improved filtration is obtained with increased temperatures. If temperatures over 25° C. are employed, the optimum measured pH may be calculated from the above relationship. Thus, at 40° C. the optimum pH value would be 5.7.

The concentration of uranyl nitrate in the influent stream is not critical to our invention, and any convenient concentration such as 80 to 400 grams uranium per liter may be employed. The ordinary concentration of the product solution obtained in large-scale solvent extraction of ore concentrates, i.e., approximately 100 grams uranium per liter, is particularly suitable for this process.

The concentration of the ammonium hydroxide solution may be varied up to approximately 30 percent ammonia by weight to provide the desired pH. It is preferred, however, to employ a relatively dilute solution within the range of 4 to 10 percent by weight ammonia. At lower concentrations excessive volumes of material are required, and at concentrations over 10 percent increased mixing by means such as introduction of the reagent streams into the vortex created by a rotary impeller is required.

Continuous mixing of the reactant slurry is essential to the method of our invention. Maximum homogeneity of the reaction mass is desirable in order to minimize the amount of partially reacted material which is discharged as product and to avoid contact of the pH sensing device with the reagent streams in an incompletely mixed state. In addition, continuous mixing of the slurry prevents the formation and retention of highly ammoniated compounds in the slurry. At the preferred ammonium concentrations adequate mixing may be obtained by the use of conventional agitation means such as propeller-type mixers in conjunction with suitable baffles. At higher ammonium concentrations more rapid initial dispersion of the reagent streams is required. This may be accomplished by introducing the reagent streams into the vortex formed by a propeller mixer in an unbaffled tank or otherwise ensuring that the reagent streams enter the reaction zone in an area of high turbulence. The agitation speed required for suitable mixing varies with the particular apparatus employed. For example, in a two-gallon tank, eight inches in diameter and provided with four one-inch baffles extending from top to bottom, a two-inch diameter, three-bladed marine propeller provides thorough mixing when rotated at a speed of 1250 revolutions per minute, and in an 80-gallon tank 26 inches in diameter a propeller mixer provided with two seven-inch marine type propellers provides suitable mixing at a speed of 380 r.p.m.

A portion of the slurry is continuously withdrawn from the reaction zone during operation. Although the method of removal is not critical it is preferred to pump the slurry from the bottom of the reaction vessel in order to prevent removal of unreacted material.

The product precipitate may be separated from the slurry by conventional methods such as filtration or centrifugation. Although not critical, separation by means of vacuum filtration is preferred. The filtered precipitate is then recovered and dried, preferably in air at a temperature of approximately 225° C.

The precipitate is then converted to $UF_4$ by means of hydrogen reduction and hydrofluorination. Although not critical, it is preferred to calcine the precipitate prior to reduction in order to provide powder with maximum surface areas and reactivity in the subsequent steps. A calcination temperature of approximately 800° F. is required for high surface area, and at temperatures over 1100° F. the powder tends to sinter. Accordingly, a temperature in the range of 800° F. to 1100° F. is preferred. Calcination may be carried out by heating the powder to this temperature for approximately 30 minutes. The calcined powder comprises largely $U_3O_8$ with a lesser amount of of $UO_3$ and other oxides. Alternately, the dried precipitate may be reduced without being previously calcined, in which case conversion to $U_3O_8$ and reduction to $UO_2$ occur simultaneously.

Reduction of the powder to $UO_2$ is effected by contacting the powder with hydrogen at an elevated temperature. Although the conditions under which reduction is carried out are not critical to our invention, it is preferred to employ a reduction temperature within the range of 900° F. to 1100° F. At lower temperatures the reaction proceeds slowly and at higher temperaures thermal damage to the powder may result. The apparatus employed is likewise not critical, but this material is particularly suited to reduction in a fluidized-bed reactor. Other reactors such as the vibrating tray and screw type may also be employed.

The $UO_2$ produced by reduction is then converted to $UF_4$ by reaction with excess anhydrous hydrogen fluoride at elevated temperatures. The reaction conditions in this step are not critical, and any of the processes used for $UO_2$ produced by previous methods may be employed. It is preferred, however, to contact the $UO_2$ with HF in a continuous reactor provided with staged temperature zones ranging from 600° F. to 1200° F. The $UO_2$ is introduced into a zone maintained at the lowest temperature and conveyed through gradually hotter zones for a period of 15 to 20 minutes until the maximum temperature is reached. The excess of hydrogen fluoride employed in this reaction is not critical.

The $UF_4$ thus obtained may be converted to uranium metal by reduction with magnesium or to $UF_6$ by reaction with fluorine.

The apparatus to be employed in the method of our invention is not critical, and numerous variations may be employed. For large-scale operation it is preferred to employ a cylindrical tank for precipitation, with a mechanical agitator being provided to insure proper mixing. The reactants are introduced from adjacent storage tanks into the top surface of the slurry in the precipitation tank. The pH of the slurry may be maintained by providing mined by fluorometric analysis. The total solids content of the filter cake was determined by weighing the residue obtained by drying the cake in air for 24 hours at 110° C. The uranium content of the filter cake was determined by gravimetric analysis, and ammonia nitrogen and total nitrogen were determined by Kjeldahl analysis. Further details and results of these tests may be seen by reference to the following table.

*Table I*

CONTINUOUS PRECIPITATION OF URANIUM FROM URANYL NITRATE SOLUTION

| Test number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Slurry pH | 5.75 | 6.2 | 6.8 | 7.1 | 6.1 | 5.7 | 6.2 | 5.7 | 6.65 | 7.2 | 5.2 | 4.7 | 6.2 | 5.7 | 5.7 |
| Uranyl nitrate solution flow (grams uranium per minute) | 0.80 | 0.80 | 0.80 | 0.77 | 0.77 | 0.80 | 0.77 | 0.80 | 0.80 | 0.74 | 0.78 | 0.76 | 0.76 | 0.78 | 0.78 |
| $NH_4OH$ flow (grams $NH_3$ per minute) | 0.126 | 0.116 | 0.122 | 0.125 | 0.118 | 0.103 | 0.110 | 0.112 | 0.148 | 0.131 | 0.121 | 0.128 | 0.109 | 0.104 | 0.101 |
| Mean residence time (minutes) | 80 | 110 | 120 | 100 | 110 | 250 | 270 | 290 | 280 | 280 | 290 | 300 | 310 | 310 | 310 |
| Settling rate (feet per hour) | 7.8 | 5.2 | 1.7 | 0.5 | 4.0 | 10.7 | 7.5 | 7.8 | 3.2 | 1.0 | 8.1 | 6.5 | 0.7 | 4.7 | 6.0 |
| Filtration rates, filter leaf (gallons per hour per square foot) | 247 | 124 | 78 | 43 | 130 | 252 | 185 | 250 | 133 | 107 | 348 | 247 | 112 | 196 | 226 |
| Filtration rate, glass disc (milliliters per minute) | 83 | 62 | 34 | 16 | 61 | 93 | 78 | 91 | 40 | 34 | 89 | 90 | 25 | 68 | 98 |
| Filtrate total uranium concentration (grams uranium per liter) | 0.20 | 0.055 | 0.16 | 0.31 | 0.027 | 0.044 | 0.069 | 0.062 | 0.18 | 0.34 | 0.066 | 0.19 | 0.064 | 0.104 | 0.010 |
| Filtrate soluble uranium concentration (grams uranium per liter) | 0.011 | 0.006 | 0.003 | 0.018 | 0.0005 | 0.003 | 0.002 | 0.007 | 0.004 | 0.009 | 0.003 | 0.013 | 0.019 | 0.004 | 0.006 |
| Filter cake total solids (percent) | 81.6 | 73.7 | 69.0 |  | 73.3 | 85.9 | 82.9 | 91.4 |  | 65.8 | 92.6 | 91.8 | 62.3 | 79.4 | 84.4 |
| Filter cake uranium content (percent) | 74.1 | 72.5 | 72.5 | 69.9 | 72.6 | 76.9 | 72.3 | 76.2 |  | 70.3 | 74.1 | 73.7 |  |  |  |
| Filter cake ammonia nitrogen content (percent) | 2.06 | 1.98 | 2.47 | 3.54 | 3.11 | 2.35 | 2.20 | 1.78 |  | 2.90 | 1.61 | 1.57 |  |  |  |
| Filter cake nitrate nitrogen content (percent) | 0.49 | 0.68 | 0.74 | 1.13 | 0.91 | 1.15 | 0.44 | 0.35 |  | 1.08 | 0.27 | 0.33 |  |  |  | pH sensing instruments which in turn actuate the ammonium hydroxide feed pump. In order to provide reliable pH control the pH sensing devices must not be located in proximity to either of the influent reactant streams. As pointed out above the means provided for continuous removal of the slurry should also be so located as to remove only thoroughly mixed slurry. Conventional apparatus and techniques may be employed in the filtration step and in conversion of the filtered precipitate to $UF_4$.

Our invention is further illustrated by the following specific examples.

EXAMPLE I

A series of continuous precipitation tests were conducted in order to determine the filtration properties of the precipitate obtained in the method of our invention. Each precipitation test was carried out in a 2 liter beaker provided with a mechanical agtator. A stream of a uranyl nitrate solution at a concentration of approximately 160 grams per liter and a stream of an aqueous ammonium hydroxide solution at an ammonia concentration of 28 percent by weight were continuously introduced into the top of the beaker. The reactant slurry was heated to a temperature of 45° C. to 50° C. throughout the tests. The product was removed from the bottom of the beaker by suction. The slurry pH was maintained at a constant value during each test by introducing the ammonium hydroxide solution through an automatic titrator which regulated the flow of this solution in response to signals from a pH indicator in the slurry. The flow of reactants and mean residence time of the slurry in the beaker were varied for some of the tests. After a period of operation of six hours in each test the slurry was removed and subjected to settling and filtration measurements. Settling rates were measured at room temperature in 1000 milliliter graduated cylinders by observing the level of settled solids at regular intervals and recording the elapsed time of the test. Filtration rates were determined by the use of a standard 0.1 square foot filter leaf test and by measuring the filtration rate across a fritted glass disc (Corning No. 39535, 30 millimeter diameter, M porosity). The total uranium content and the soluble uranium content of the filtrate were determined by fluorometric analysis.

It may be seen from the above table that precipitation of the uranium was virtually complete, as evidenced by the low soluble uranium content of the filtrate. The unsuitability of a pH below 5 is demonstrated by the higher soluble uranium content in test 12, conducted at a pH of 4.7. Suitably high filtration rates were obtained in most of the tests, with the loss of fine insoluble uranium particles through the filter being low as evidenced by the total uranium content of the filtrate. The high total solids content of the filter cake indicates the relatively dense, easily-handled type of precipitate obtained under these conditions.

EXAMPLE II

The precipitate obtained in test number 6 of Example I was converted to $UF_4$ by reduction with hydrogen and hydrofluorination under controlled conditions in a laboratory thermobalance. Reduction was carried out by contacting the precipitate with hydrogen at gradually increasing temperatures from 850° F. to 1200° F. The $UO_2$ thus prepared was then contacted with anhydrous hydrogen fluoride at gradually increasing temperatures from 600° F. to 1200° F. Conversion to 97 percent $UF_4$ was reached after an HF contact time of approximately 22 minutes. Uranium trioxide prepared by the calcination of uranyl nitrate containing 650 parts per million sulfate for increased reactivity was then reduced to $UO_2$ and hydrofluorinated to $UF_4$ under the conditions described above. The $UO_3$ material required 35 minutes' contact time to reach a level of 97 percent conversion. The shorter contact time for the precipitated material indicates the suitability of our invention for the preparation of $UF_4$.

EXAMPLE III

A continuous precipitation run was conducted on a pilot-plant scale, for fourteen consecutive days. A uranyl nitrate solution at a concentration of 160 grams uranium per liter and an ammonium hydroxide solution at an ammonia content of 28 percent by weight were continuously fed into an eighty-gallon stainless steel tank having an inside diameter of 26 inches, a height of 36 inches at this diameter, and a 60-degree conical bottom 23 inches high. The reactant slurry was agitated by means of a ¼-horsepower mixer with two seven-inch marine type propellers extended to a point near the bottom of the tank, the propellers being rotated at a speed of approximately 380 r.p.m. The uranyl nitrate flow rate was held constant at 19.6±1.5 gallons per hour by means of a metering pump. Ammonium hydroxide addition to the slurry was effected by means of a pump responsive to signals from a pH recorder-controller instrument, the ammonium hydroxide flow being varied to provide a constant pH of 5.7. The slurry temperature was maintained at 120° F. The slurry obtained each day was continuously removed after a mean residence time of 4 hours. A rotary pump was used to remove the slurry from the bottom of the tank and discharge the slurry by gravity to a filter. The precipitated slurry from each run was filtered on a three-foot diameter by one foot rotary vacuum drum filter with a closely woven, multi-filament nylon fabric. The cake was then washed with 19 gallons per hour of deionized water. Filtration rates were determined on samples of the slurry in the leaf filter test employed in Example I. The slurry settling rate was also determined in accordance with the procedure of Example I. The filter cake was dried in air and the tap density and total solids content were determined. The dried precipitate was then tested for reduction reactivity by contacting a sample in a thermobalance at 500° C. with hydrogen until 97 percent conversion to $UO_2$ was obtained, with the time required, in seconds, being designated as "Reduction Number." The results obtained in these runs may be seen by reference to the following table.

*Table II*

PILOT-PLANT SCALE CONTINUOUS PRECIPITATION

| Day of operation | Filtration rate (gals. per sq. ft. per hr.) | Settling rate (ft./hr.) | Tap density (grams per milliliter) | Total solids (percent) | Reduction number (seconds) |
|---|---|---|---|---|---|
| 1 | 162 | 3.3 | 1.86 | 90.7 | 260 |
| 2 | 168 | 3.2 | 2.02 | 93.1 | 275 |
| 3 | 178 | 3.3 | 1.92 | 90.7 | 230 |
| 4 | 187 | 3.2 | 1.88 | 90.9 | 240 |
| 5 | 189 | 3.3 | 1.90 | 91.1 | 235 |
| 6 | 178 | 2.8 | 1.89 | 93.0 | 260 |
| 7 | 127 | 1.7 | 1.84 | 91.3 | 255 |
| 8 |  |  | 1.90 | 89.3 | 240 |
| 9 | 191 | 3.2 | 1.91 | 88.4 | 250 |
| 10 | 174 | 3.6 | 1.97 | 93.4 | 270 |
| 11 | 180 | 3.2 | 1.99 | 94.0 | 275 |
| 12 | 174 | 4.3 | 1.97 | 88.6 | 265 |
| 13 | 240 | 4.3 | 1.97 | 90.0 |  |
| 14 | 174 | 3.1 | 2.00 | 90.7 |  |

It may be seen from the above table that consistently high filtration rates were obtained in this run. The reduction number values are consistently low, approximately one-half the values which are obtained from reduction of pot-calcined $UO_3$ to $UO_2$ under similar conditions.

EXAMPLE IV

Uranium was continuously precipitated from aqueous uranyl nitrate solution on a one ton per day scale. Precipitation was carried out in 400-gallon stainless steel tanks equipped with a centrally mounted, variable speed agitator. The uranyl nitrate solution at a concentration of 160 grams uranium per liter was continuously fed into the tank by means of a pump at a constant rate of sixty gallons per hour. A 28 percent ammonium hydroxide solution was continuously fed into the slurry by means of two pumps, one pump feeding a constant 4 gallons per hour and the other varying between 2 and 3 gallons per hour in response to pH signals. The precipitation pH was controlled by a recorder-controller instrument which sent electrical signals through an electro-pneumatic converter to an air motor which positioned a rheostat in the speed control circuit of the ammonium hydroxide pump. Precipitate slurry was pumped from the bottom of the precipitation tank to a filter by means of a 20 g.p.m. centrifugal pump. Precipitation was carried out at a pH of 5.6 to 5.8. The influent reagent streams were introduced into the vortex created by the agitator rotated at a speed of 315 to 385 r.p.m. to provide improved mixing. The precipitation temperature was within the range of 90° F. to 105° F. The slurry was continuously removed after a mean residence time of four hours. The slurry was then filtered in a rotary vacuum filter operated at a speed of 0.25 to 0.4 revolution per minute. The filter cake was washed with deionized water at 70° F. to 90° F. sprayed through six nozzles mounted over a portion of the filter. The filter cake was then removed and dried in a steam heated, screw-type dryer. The dried precipitate was then calcined at a temperature within the range of 800° F. to 900° F. The calcined product was analyzed to determine the following properties: oxygen to uranium ratio, 2.67 to 3.0 to 1; tap density, 2.50 to 2.70 grams per cubic centimeter; reduction number (as described in Example III above), 225 to 275 seconds; and surface area, 10 to 12 square meters per gram.

EXAMPLE V

Approximately 13,000 pounds of the calcined product produced as described in Example IV above was converted to $UF_4$ on a plant scale. The calciner product was placed in hoppers and fed into two stage fluidized-bed reactors placed in series at a rate of 572 pounds per hour. Reduction was effected by means of gaseous hydrogen contained in dissociated ammonia. Reduction conditions may be seen by reference to the following table.

*Table III*

CONDITIONS EMPLOYED IN REDUCTION OF CALCINER PRODUCT TO $UO_2$

| Hydrogen excess | 1.99 of stoichiometric |
|---|---|
| Internal temperature: |  |
| Stage 1 | 600° F. to 700° F. |
| Stage 2 | 1,000° F. |
| Gas velocity: |  |
| Stage 1 | 0.41 feet per second. |
| Stage 2 | 0.44 feet per second. |
| Inlet dissociated ammonia pressure: |  |
| Stage 1 | 2.4 p.s.i.g. |
| Stage 2 | 4.5 p.s.i.g. |

The $UO_2$ thus obtained was removed from the reduction reactors and converted to $UF_4$ in three screw-type reactors arranged in series. The $UO_2$ was fed at a rate of 484 pounds uranium per hour, and anhydrous hydrogen fluoride was fed a stoichiometric excess of 8 percent. The average reduction temperatures during the reaction may be seen by reference to the following table.

*Table IV*

AVERAGE HYDROFLUORINATION REACTION TEMPERATURE

| Reactor | Temperature (° F.) in zone | | | |
|---|---|---|---|---|
|  | 1 | 2 | 3 | 4 |
| 1 | 654 | 855 | 937 | 854 |
| 2 | 807 | 869 | 865 | 952 |
| 3 | 960 | 1,000 | 1,050 | 1,050 |

The product $UF_4$ was then recovered and analyzed to determine the percentage conversion to $UF_4$, $UO_2F_2$ content and ammonium oxalate insoluble content (this fraction is a mixture of oxides in the product). For two samples $UF_4$ conversions of 97.19 and 96.95 percent were obtained. The $UO_2F_2$ content was 0.89 and 1.50, and ammonium oxalate insoluble content was 1.92 and 1.55.

It may be readily seen from the above that a high quality $UF_4$ product may be obtained on a large scale by the method of our invention.

EXAMPLE VI

Two lots of $UF_4$ produced as described in Example V above and one control lot of $UF_4$ produced from $UO_3$ obtained by thermal denitration of uranyl nitrate were reduced with magnesium to produce metallic uranium on a large scale. Reduction was carried out in a batch-type reduction-bomb method, with the $UF_4$ and magnesium being blended and charged into a bomb lined with magnesium fluoride. In each reduction 445 pounds of $UF_4$ and 70 pounds of magnesium were employed as reactants. The reduction bomb was heated to produce an exothermic reaction, with uranium metal forming and collecting in the form of a derby at the bottom of the bomb. The uranium derby was then recovered and weighed. Further details and results obtained may be seen by reference to the following table.

*Table V*

$UF_4$ REDUCTION EVALUATION

| Type of $UF_4$ | Number of reductions | Furnace control temperature (°F) | Average firing time (minutes) | Firing time range (minutes) | Average metal yield (percent) | Metal yield range (percent) |
| --- | --- | --- | --- | --- | --- | --- |
| Prepared from $UO_3$ obtained by calcination of uranyl nitrate | 3 | 1,200 | 213 | 140–340 | 89.5 | 86.8–92.8 |
| Prepared by method of Example V | 10 | 1,200 | 244 | 180–298 | 92.6 | 87.8–98.3 |
| Do | 7 | 1,150 | 216 | 164–315 | 88.6 | 83.8–95.1 |

It may be seen from the above table that the $UF_4$ prepared by the method of our invention is suitable for the preparation of uranium metal since the yield obtained for this material in most cases equaled or exceeded the yield for $UF_4$ produced by a previous large-scale production method.

EXAMPLE VII

The uranium derbies prepared as described in Example VI were heated in a vacuum induction furnace to a temperature of 2550° F. and cast into molds to form ingots. The ingots were cropped and sampled top and bottom for chemical and spectrochemical analysis. The ingots were found to have a suitable average density of approximately 18.98. The impurity of content of the metal produced from $UF_4$ obtained by the method of our invention was approximately the same as for the control lots except for a slightly higher than control content of iron and nitrogen, which impurities were still below the levels established for nuclear reactor fuel elements.

The above examples are merely illustrative and are not to be understood as limiting the scope of our invention, which is limited only as indicated by the appended claims. It is also to be understood that numerous variations in apparatus and procedure may be employed by one skilled in the art without departing from the scope of our invention.

Having thus described our invention, we claim:

1. The method of converting an aqueous uranyl nitrate solution to uranium tetrafluoride which comprises continuously introducing a stream of said solution and a stream of an aqueous ammonium hydroxide solution containing less than 30 percent ammonia by weight into a reaction zone for a period greater than about two hours, the ratio of ammonia to uranium in said streams being adjusted to maintain the pH of the resulting reaction mass within the range of 5.0 to 6.5 and the flow rates of said streams into said reaction zone being adjusted to provide a mean residence time of said reaction mass in said reaction zone of at least 30 minutes, continuously mixing said reaction mass, continuously withdrawing a portion of said reaction mass from said reaction zone, separating the resulting solids from the resulting withdrawn portion, contacting the solids separated from that part of the withdrawn portion removed from said reaction zone after the first two hours of said period with gaseous hydrogen at an elevated temperature until the formation of uranium dioxide is substantially complete and contacting the resulting uranium dioxide with anhydrous hydrogen fluoride at an elevated temperature until the formation of uranium tetrafluoride is substantially complete.

2. The method of claim 1 in which the mean residence time of said reaction mass in said reaction zone is at least one hour.

3. The method of claim 1 in which said reaction mass is maintained at a pH of approximately 6.

4. The method of claim 1 in which said separated solids are calcined at a temperature within the range of 800° F. to 1100° F. prior to being contacted with hydrogen.

5. The method of converting an aqueous uranyl nitrate solution to uranium tetrafluoride which comprises continuously introducing a stream of said solution at a uranium concentration within the range of 80 to 250 grams uranium per liter and a stream of an aqueous ammonium hydroxide solution at a concentration within the range of 4 to 30 weight percent ammonia into a precipitation vessel for a period greater than two hours, the ratio of ammonium to uranium being adjusted to maintain the resulting slurry in said vessel at a pH within the range of 5.0 to 6.5 and the flow rates of said streams being adjusted to provide a mean residence time of said slurry in said vessel of at least one hour, continuously agitating said slurry, continuously removing a portion of said slurry from said vessel, filtering said removed slurry, drying the resulting filter cake, reducing the dried solids separated from that part of said slurry removed from said vessel after the first two hours of said period with hydrogen at an elevated temperature and contacting the resulting solids with anhydrous hydrogen fluoride at an elevated temperature until the formation of uranium tetrafluoride is substantially complete.

6. The method of claim 5 in which said slurry is maintained at a pH of approximately 6.

7. The method of claim 5 in which said dried filter cake is calcined at a temperature of 800° F. to 1100° F. prior to reduction.

8. The method of claim 5 in which said dried filter cake is reduced at a temperature within the range of 900° F. to 1100° F.

9. The method of claim 5 in which said reduced solids are contacted with anhydrous hydrogen fluoride at gradually increasing temperatures within the range of 600° F. to 1200° F.

References Cited in the file of this patent

UNITED STATES PATENTS

| 2,797,977 | Forward | July 2, 1957 |
| 2,849,280 | Lebaron et al. | Aug. 26, 1958 |
| 2,866,680 | Long | Dec. 30, 1958 |

OTHER REFERENCES

U.S.A.E.C. Document—TID 7546, Book 2, pp. 386, 395, March 1958.

Yatabe et al.: CRCE-716, Part II, pages 1–18. Atomic Energy of Canada, Ltd., Chalk River, Ontario, June 1958.

2nd U.N. Int. Conf. on Peaceful Uses of Atomic Energy, vol. 4, pp. 16, 17, 19, 37, 38, September 1958.

Kuhlman et al.: "I. and E. Chem.," vol. 50, No. 12, pp. 1774–1776, December 1958.

Harrington et al.: "Uranium Production Technology," pp. 68–69, 208–210 (1959).